United States Patent [19]
Pham

[11] Patent Number: 5,984,228
[45] Date of Patent: *Nov. 16, 1999

[54] RAPIDLY-CONVERTIBLE ROADABLE AIRCRAFT

[76] Inventor: Roger N. C. Pham, 625 Veranda Ct., #1140, Grand Prairie, Tex. 75050

[*] Notice: This patent issued on a continued prosecution application filed under 37 CFR 1.53(d), and is subject to the twenty year patent term provisions of 35 U.S.C. 154(a)(2).

[21] Appl. No.: 08/811,503

[22] Filed: Mar. 5, 1997

Related U.S. Application Data

[60] Provisional application No. 60/012,719, Mar. 4, 1996.

[51] Int. Cl.$^6$ .................................................. B64C 37/00
[52] U.S. Cl. ............................... 244/2; 244/46; 244/49; 244/100 R; 244/104 FF
[58] Field of Search .................................. 244/2, 46, 49, 244/50, 100 R, 102 R, 102 SL, 45 R, 45 A, 55, 104 PP

[56] References Cited

U.S. PATENT DOCUMENTS

| | | | |
|---|---|---|---|
| 2,110,563 | 3/1938 | Thoan | 244/2 |
| 2,350,608 | 6/1944 | Griffith | 244/2 |
| 2,375,423 | 5/1945 | Lobell | 244/49 |
| 2,446,528 | 8/1948 | Clark | 244/2 |
| 2,584,961 | 2/1952 | Beck et al. | 244/55 |
| 2,735,634 | 2/1956 | Fosness | 244/102 SS |
| 2,746,698 | 5/1956 | Ross | 244/49 |
| 3,134,560 | 5/1964 | Halsmer | 244/2 |
| 3,261,572 | 7/1966 | Gorton | 244/2 |
| 3,960,103 | 6/1976 | Rey | 244/2 |
| 4,720,061 | 1/1988 | Abdenour et al. | 244/49 |
| 4,881,701 | 11/1989 | Bullard | 244/2 |
| 5,435,502 | 7/1995 | Wernicke | 244/2 |

FOREIGN PATENT DOCUMENTS

| | | | |
|---|---|---|---|
| 1334496 | 7/1963 | France | 244/46 |

*Primary Examiner*—Galen L. Barefoot

[57] ABSTRACT

A fixed wing aircraft that can be automatically and rapidly converted to a roadway vehicle within seconds while driving in the highway, comprising a one-piece wing rotatably mounted on top of the fuselage. The aircraft features a 3-horizontal-surface design allowing good pitch stability and damping in a very short fuselage, stall-resistant feature and reduction in induced drag at cruise speed. The aircraft's wing is enlargeable with additional wing tip segments allowing boost in aspect ratio hence improving efficiency at high loads. The vehicle has low center of gravity, four wheels with independent suspension, nose-height leveling for take-off and landing, and anti-sway mechanism in order to prevent roll-over in a tight turn. Ground propulsion is by both a ducted fan and hydraulic rear wheel drive allowing rapid accleration in the roadable mode.

15 Claims, 8 Drawing Sheets

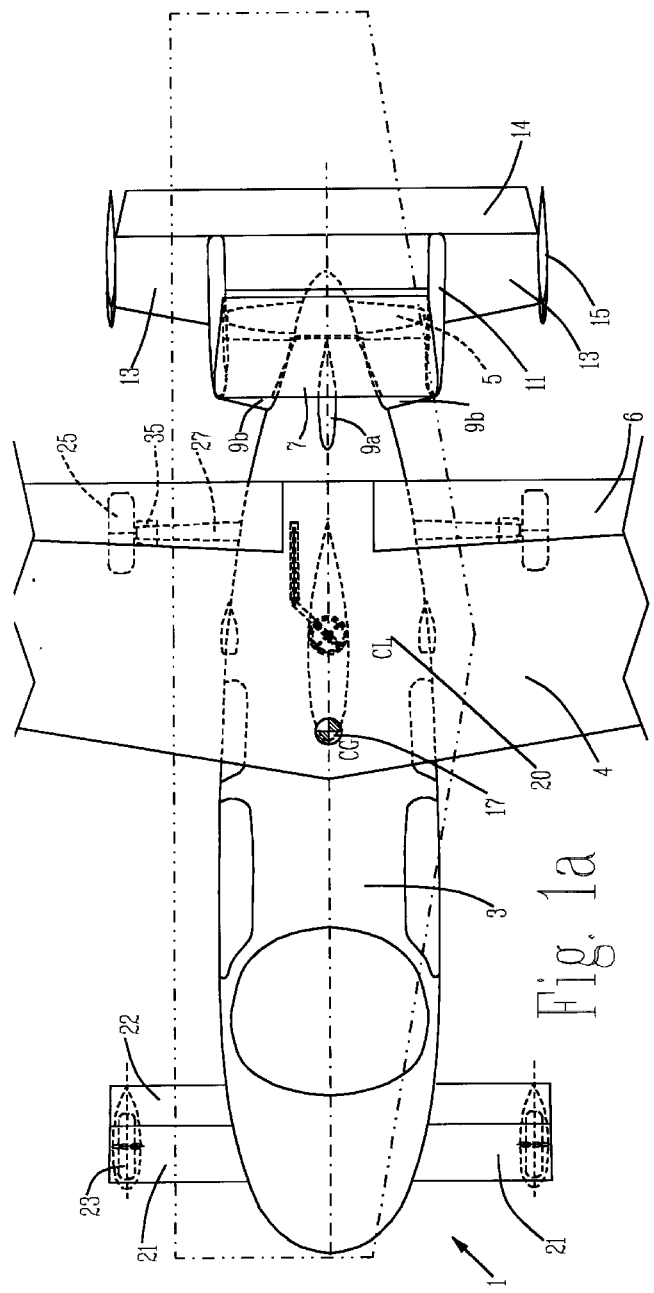
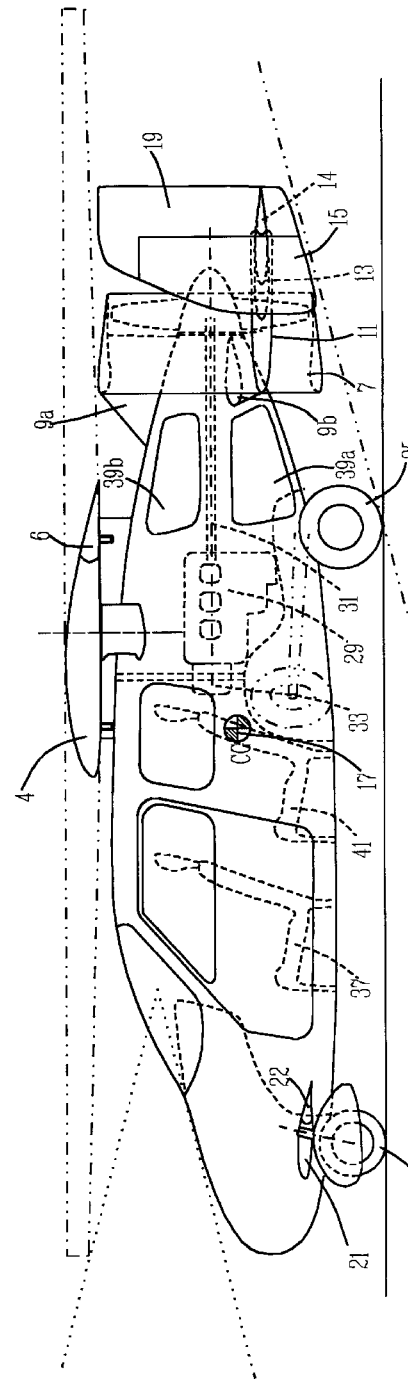
Fig. 1a
Fig. 1b

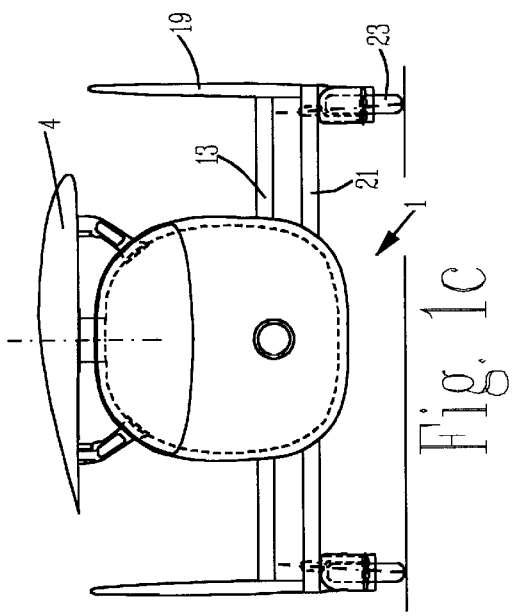
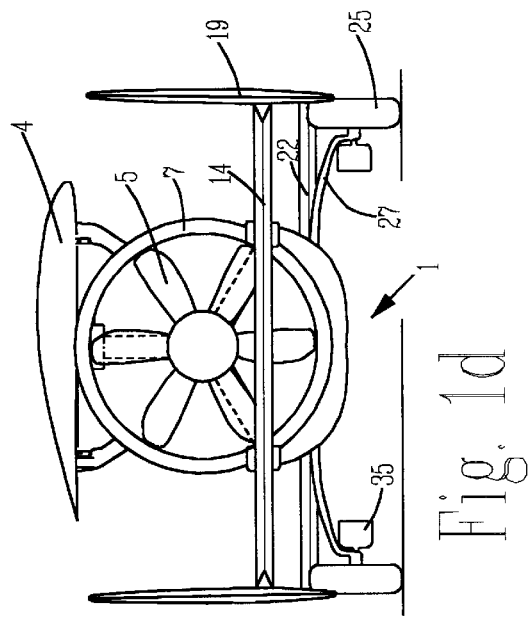

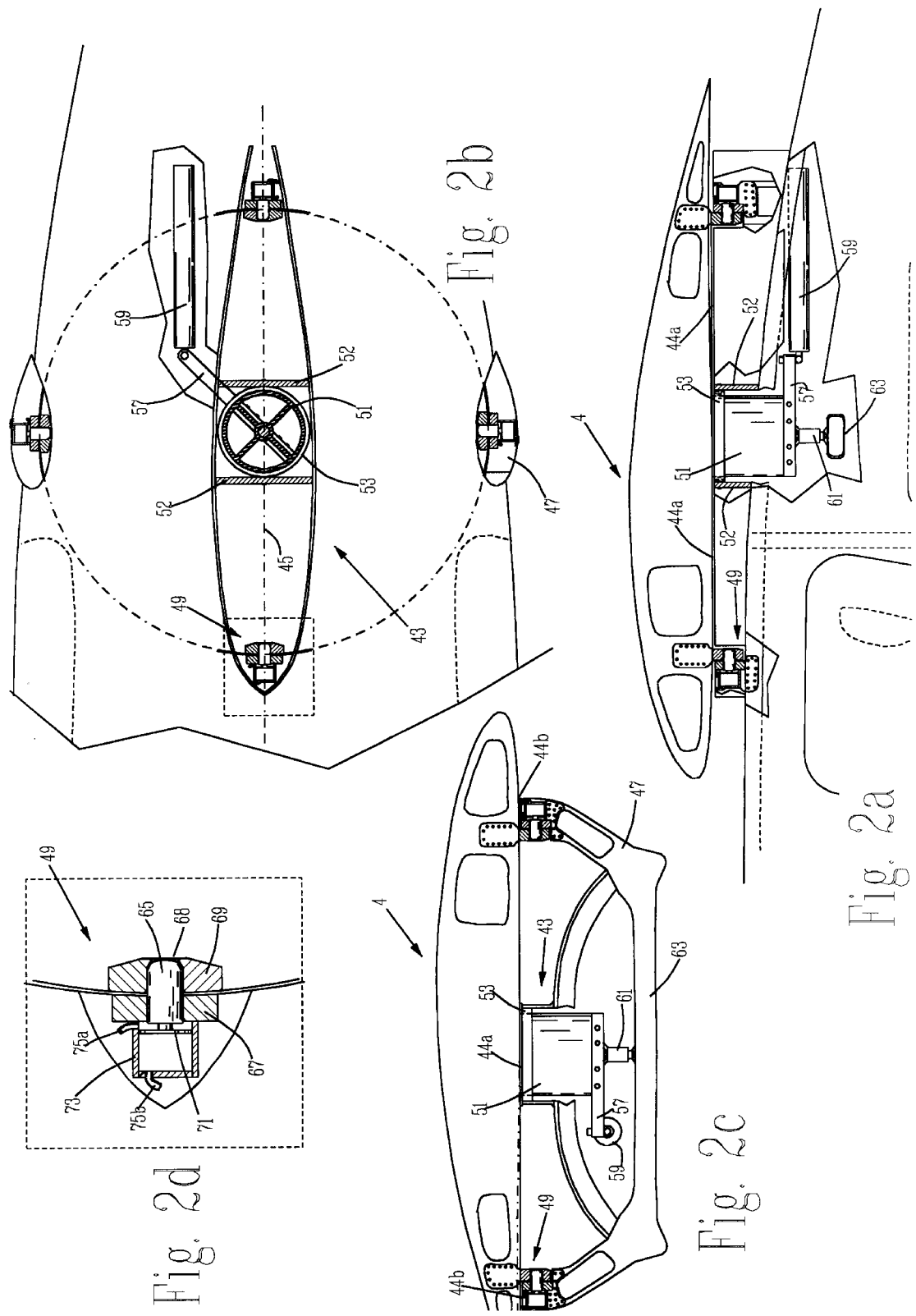

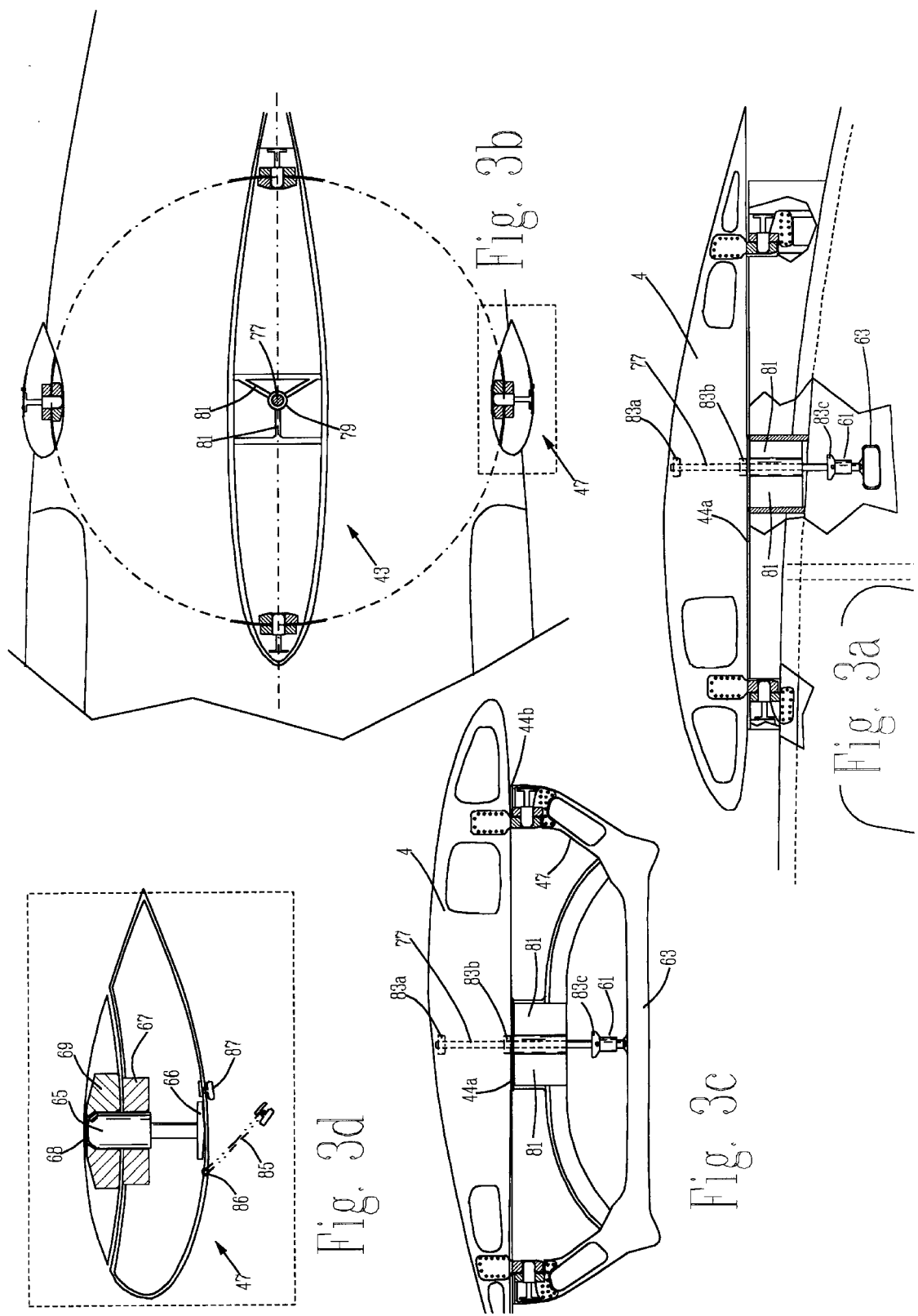

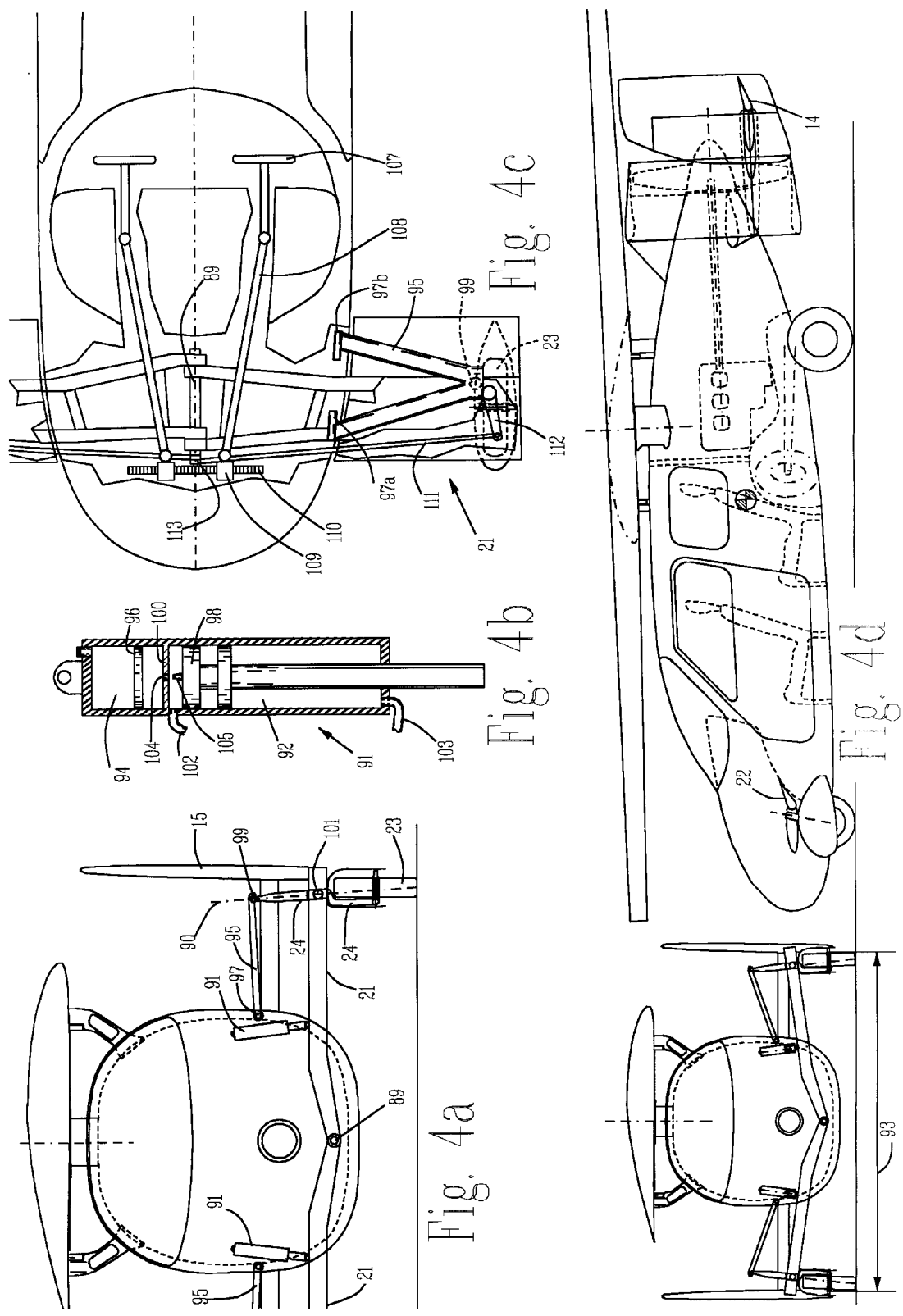

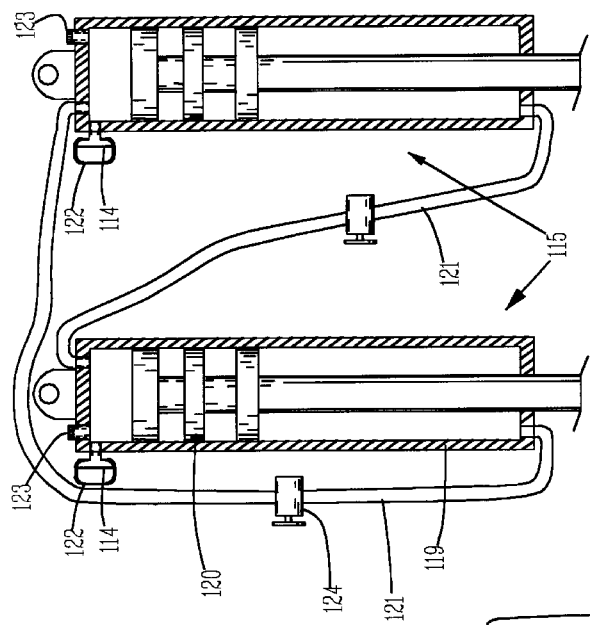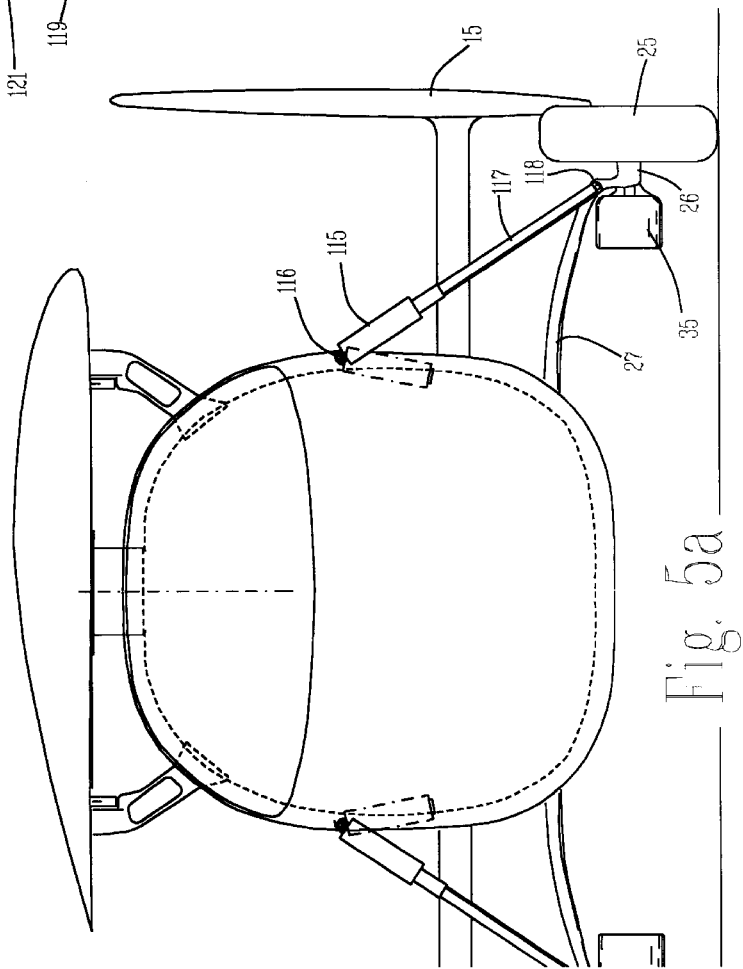
Fig. 5b
Fig. 5a

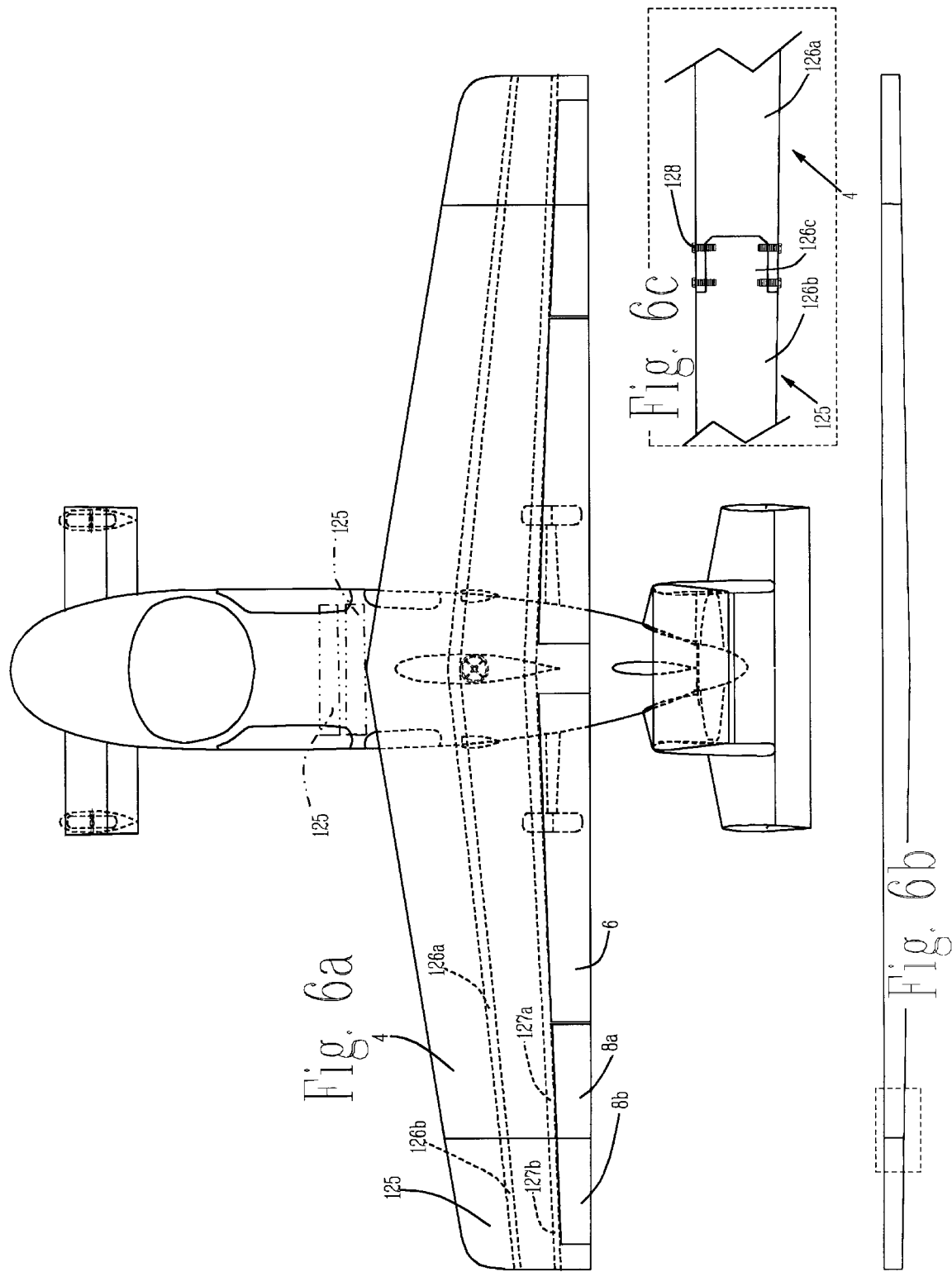

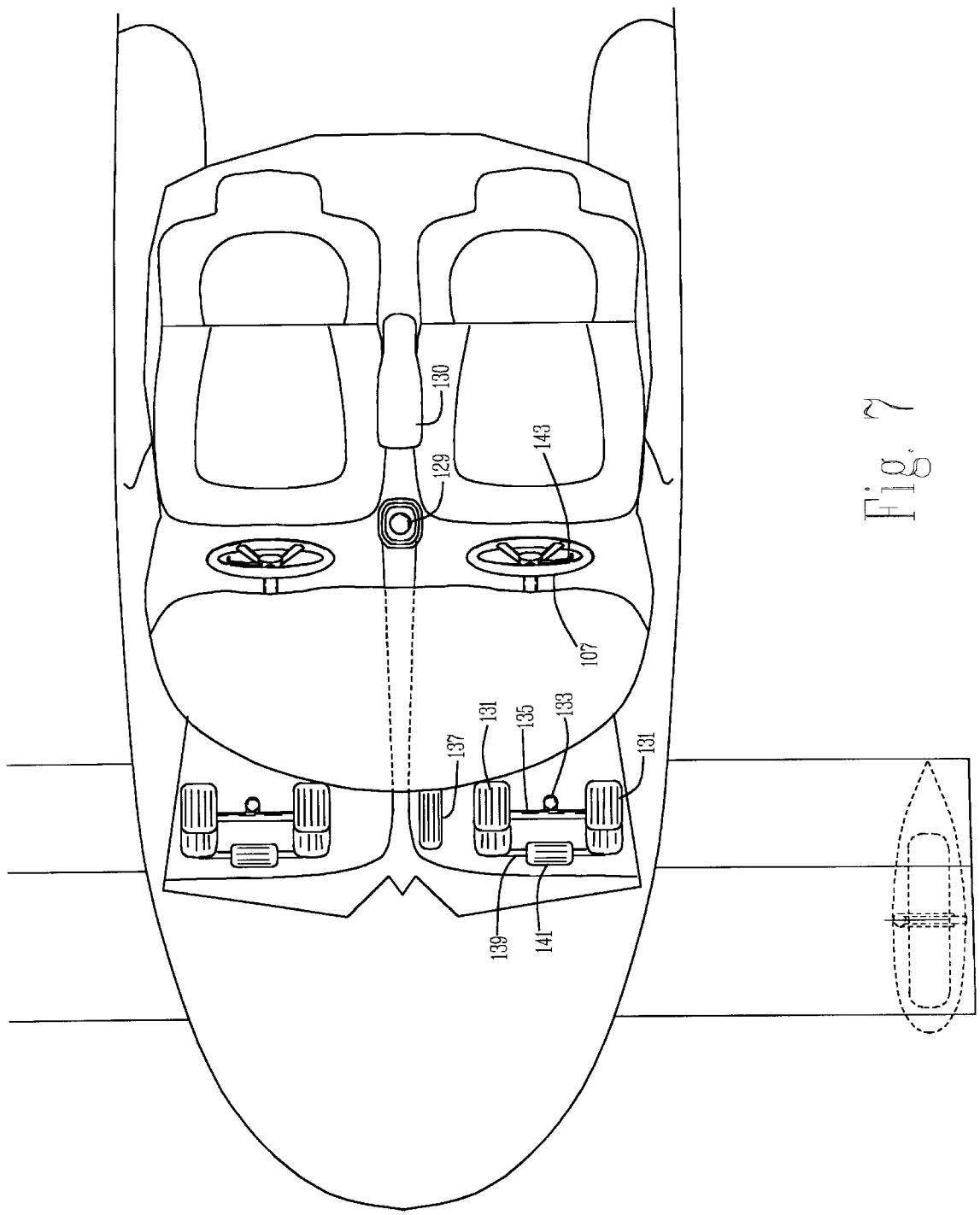

RAPIDLY-CONVERTIBLE ROADABLE AIRCRAFT

This application claims benefit of Provisional Appln. 60/012,719 filed Mar. 4, 1996.

BACKGROUND OF THE INVENTION

1. Field of the Invention

In general, this invention pertains to convertible fixed wing aircraft of the type that can be flown as a more-or-less conventional fixed wing aircraft, or be rapidly and automatically converted to an automotive street vehicle in order to arrive at one's final destination quickly and conveniently without having to transfer to a ground vehicle at the airport.

More particularly, the means to arrive at rapid conversion from aircraft mode to automobile mode involves, quite simply, rotation of the wing from a transverse orientation with respect to the fuselage or body to a longitudinal orientation whereby the vehicle's width is less than the maximum legal width of eight feet (2.44 m), without requiring any dissembly of any part including wing, tail or fuselage that may be potentially inconvenient and time-consuming. Conversion from automobile mode to aircraft mode (and vice-versa) may be done nearly instantaneously while the vehicle is traveling at legal highway speed, thereby allowing new three-dimensional use of the current highway system in the 21st century (at designated segments only) with the concept of "vertical exit" and "vertical merging" (or take-off and landing in today's language).

2. Discussion of the Prior Art

The idea of a single vehicle that can function as an aircraft to cover long distances in the shortest time, and then as a highway vehicle that can be driven from the airport to the ultimate destination, is an attractive one. However, there are many problems that make this ideal concept difficult to realize, and while many have attempted to design such a vehicle, there has never been a successful product that has reached the market.

The problem has been in integrating the functions and structural requirements of the two vastly different vehicles into a single, user-friendly construction that requires a minimum of human intervention in switching from the automotive to the aircraft configuration. The technological bases for both invidual systems are highly developed, and it is necessary that this high level of technology for both systems be incorporated in a single system while maintaining the performance of these different systems.

The structural design requirements for an aircraft are quite different from those of an automobile, particularly in the matter of weight and aerodynamic resistance, which must be held to the minimum level, whereas in an automobile, weight and aerodynamic streamliness are not nearly as important consideration. The aerodynamic drag of an automobile body is many times that of an airplane fuselage, due in part to the unstreamlined underbody, with all of the exposed power transmission and suspension gear. Instead, in the automobile, ground handling and comfort especially smoothness and quietness are much more highly stressed, whereas in the light aircraft, ground handling is particularly poor especially in windy condition, and that the cockpit noise and vibration level in these aircrafts are quite objectionable to the non-enthusiasts.

The overall length of the automobile is made as short as possible in order to facilitate parking and maneuverability, whereas the aircraft's fuselage is much longer in order to provide adequate pitch damping and control authority necessary to be certified for production under FAA regulation part 23.

For an air-ground convertible vehicle that is reasonably operable in both modes, a great deal of compromise must be made among above factors, such that the final product up to now has been inefficient and has inferior flying characteristic in comparison to a production aircraft, at the same time requiring considerable amount of assembly or dissembly of wings, fuselage and tail section during the conversion.

The case in point is the well publicized effort of a major aircraft company Consolidated Vultee in 1947 in which an automobile body is attached to a wing-engine-tail assembly for flying and to be completely detached from this assembly for ground travel mode. Due to the aerodynamically inefficient automobile body as well as excessive weight because the automobile portion contains its own engine and transmission for ground travel, the final Convair Model 118 ConvAirCar of 1947 flew poorly with cruise speed of only 125 mph (200 km/h) and after a non-fatal crash in November 1947, the program was cancelled.

After the obvious inconvenience of the ConvAirCar in which the wing and tail must be left behind at the airport in its roadable mode, another highly publicized project, that of Mr. Molt Taylor's Aerocar I, improved on the ConvAirCar due to its ability to trailer its own wings, tails and the tail half of the fuselage. The Aerocar is only one of two roadable aircraft designs ever certified by the FAA for limited production status. Mass production of the Aerocar was almost begun by Ling-Temco-Vought company of Dallas, Tex., but was cancelled due to insufficient pre-production orders. Considerable efforts of at least two persons is required in order to assemble the wings, fuselage and tail prior to flight, and that this conversion can only be carried out in calm to light wind only. One of the owner of one of four Aerocar I prototype ever produced, Mr. Ed Sweeney stated that he is not keen on trailering the wings and tails, that he does not want to do it very often and that he has spent sometimes 45 minutes in converting the Aerocar from its street-legal mode to its flight-ready configuration.

A third well-publicized attempt at overcoming the deficiencies of prior aircar projects is the very recent project of Ken Wernicke's of Sky Technology in Hurst, Texas. Wemicke's design sidesteps car-to-plane and plane-to-car transformations by using low-aspect-ratio wings that are wider than they are long. Elaborate winglets on the end of the broad wings boost aerodynamic efficiency and make the Aircar about as wide and as long as a bus, at 8.5 ft (2.6 m) in width and 22 ft (6.7 m) in length. Even then, Wernicke's own wind tunnel data, which is disclosed in U.S. Pat. No. 5,435,502, reveal that his design's maximum lift to drag ratio (L/D) is only 7.5 at lift coefficient of only 0.3, which is only a little more than ½ of the L/D of conventional private aircraft. The L/D got much worse, however, at higher lift coefficient that is required at take-off and landing speed, in which case, a lift coefficient of as much as 1.4 to 2.6 is required for take-off and landing at smaller municipal airports. At the lift co-efficient above 1.0, the L/D of the Aircar gets less than 2, whereas in a conventional aircraft at this lift co-efficient the L/D remains around 10. This means that Wernicke's Aircar will require much more power at the slow flight speed at take-off and landing, will not be able to achieve a reasonable service ceiling due to its tremendously high induced drag at higher wings lift coefficient, and that when the engine quits it will literally fall like a brick when turning or slowed down prior to landing. This certainly does not inspire pilot's confident in a single engine aircraft's ability to survive a power-off (or dead-stick) landing. There are other questions regarding Wernicke's design with respect to pitch and roll stability in an aircraft without a horizontal stabilizer and with such a short wing span, and questions regarding its ground handling in a tricycle configuration with such a high center of gravity off the ground and such tall winglets far aft of the center of gravity.

Among those less well publicized roadable aircraft designs, including at least 76 patented designs granted between 1918 and 1993, none has been able to simultaneously solve the large number of problems inherent in a typical roadable aircraft design such as excessive weight, aerodynamic inefficiency and poor stability in comparison to a typical light airplane, time and labor consuming conversion between ground and air modes, poor ground handling in comparison to a typical automobile, and excessive complexity that translates into increase in production and maintenance cost as well as unreliability.

The prior art also includes various patents of sub-class 244/46 disclosing fixed wing aircrafts with mechanism for wing rotation 90 degrees with respect to the fuselage. To my knowledge, none of those are roadable aircrafts. They are either supersonic fighter such as in U.S. Pat. No. 4,998,689 of Woodcock, U.S. Pat. No. 3,971,535 of Jones and U.S. Pat. No. 3,155,344 of Vogt. All these designs involve wing rotation during flight therefore utilizes heavy and complex turet mechanisms capable of withstanding the full stresses in flight that are not adaptable to the lighter roadable aircraft that does not need to rotate its wing while flying. Other wing rotation mechanisms in the prior art are designed for much larger commercial or military transport aircrafts that must rotate their wing only for compact storage purpose. Their mechanisms are also too complex, too expensive and rotate too slowly for use in a light personal aircraft that must quickly transform from roadable mode to aircraft mode within a few seconds while cruising in the highway above the minimum highway speed. For examples, Rumberger et al. of U.S. Pat. No. 5,337,974 discloses a wing rotation mechanism for storage of the V-22 tilt-rotor aircraft involving a large diameter unitary ring structure as the wing bearing. This large ring structure must be precisely shaped, which involved high cost and inherently give rise to lots of friction during wing rotation, therefore rapid wing rotation is difficult, not that this necessary in its role for the tilt-rotor aircraft. Furthermore, Rumberger's design does not provide for a mechanism of wing to fuselage sealing, thus requiring very high production tolerance of the rotating surfaces involved thus further increases cost, but in a defense related project, cost concern is perhaps not a high priority. Nor does Rumberger's design provide for vibration damping between the wing and the fuselage, perhaps causing more fatigue and wear on the metal parts involved.

SUMMARY AND OBJECTIVES OF THE INVENTION

It is a main objective of this invention to disclose a new and improved air-ground vehicle design that can be automatically and almost instantaneously converted from aircraft to automobile configuration, or vice versa, without manual structural modification, and having permanently connected control systems that are conventional for both aircraft and automobile use, that is capable of flying as well as a typical modem high performance private aircraft and also capable of traveling in public roads with ground-handling, comfort and stability as good as a typical modern automobile.

It is another objective of this invention to disclose a roadable aircraft that can carries at least four adult occupants with full luggages and yet is still compact enough to fit a standard size automobile garage as well as as standard size automobile parking slot.

It is another objective of this invention to disclose a mechanism for rapidly converting an air-ground vehicle between its two modes that is simple, light in weight, reliable and low in cost.

It is another objective of this invention to provide for a cockpit system for controlling such an air-ground vehicle that is familiar to both airplane pilots and car driver so as to minimize any potential for erroneous control input from pilots previously trained in a conventional aircraft.

It is another objective of this invention to disclose a new and improved aircraft that is resistant to inadvertent stall and spin in flight, far more resistant to lost of control or over-turning (flipping over) when taxiing on the ground due to cross-wind and wind turbulent and yet has the same capability for short runway take-off and landing as a typical single engine private aircraft.

It is yet another objective of this invention to provide for a relatively inexpensive and highly efficient general aviation aircraft with a large number of safety features that can substantially reduce the accident rates in comparison to a typical single engine general aviation aircraft!

Further objects and advantages of this invention will become apparent from a consideration of the drawings and ensuing description.

In summary, in order to achieve all the aforestated objectives, the roadable aircraft of this invention embodies a one piece non-folding wing with aspect ratio of at least 5:1 for maximum lightness, simplicity and reliability. For long range traveling at gross weight rating, short wing segments may be added to the tips of this one-piece wing in order to boost the aspect ratio to 7:1 in order to increase the aircraft aerodynamic efficiency. This wing is rotatably mounted on top of the fuselage with a very simple and light-weight mechanism for rotating 90 degrees from transverse orientation in aircraft configuration to longitudinal orientation making the wing parallel to the fuselage in its automobile configuration. Because the fuselage is only 18.5 feet (5.6 m) long in order to fit in to an automobile parking slot, instead of 25–28 feet long (7.6–8.5 m) as in conventional light aircraft, it must adapt a three surface configuration with a front canard, main wing placed behind the center of gravity (CG) and a horizontal stabilizer with a pair of vertical stabilizers at the tip in order to maintain in-flight controllability and stability with stall resistant property. For maximum ground handling, four wheels with wide track width of 7.5 feet (2.1 m) are use instead of three wheels in a typical aircraft, completely with independent suspension and shock absorption system as well anti-sway mechanism. In order to reduce noise and to allow the vehicle to remain low to the ground to improve ground handling, a ducted fan mounted aft of the fuselage is used for propulsion instead of conventional propeller which is too large and too noisy. In order to reduce weight and cost of a transaxle unit for ground propulsion, the same ducted fan unit may also be used for ground propulsion. For ease of controlling in the ground, an automobile style steering wheel is mounted in the usual position. Ground acceleration and braking is done via accelerator pedal and brake pedal also in the usual position. Rudder control is via a pair of rudder pedals mounted on both sides of the brake pedal. Roll and pitch control is via a joy stick mounted in the area between the two front seats (same location as would a manual stick shift be placed) in order to be accessible to both front seat occupants in case of emergency.

BRIEF DESCRIPTION OF THE DRAWINGS

FIG. 1a, FIG. 1b, FIG. 1c and FIG. 1d are top plan view, side elevation, front view and rear view respectively of the air-ground convertible vehicle of this invention.

FIG. 2a, FIG. 2b and FIG. 2c are side elevation, top plan view and front view respectively of the hydraulically actuated wing mounting and rotation mechanism.

FIG. 2d is a close up view of a hydraulically actuated locking pin used to lock the wing to the fuselage.

FIG.'s 3a, 3b, 3c and 3d are the same view arrangement as in FIG.'s 2a, 2b, 2c, and 2d respectively, but of the manually operated wing mounting and rotation mechanism.

FIG. 4a and FIG. 4c show details of the front wheel mounting and suspension mechanism.

FIG. 4b shows internal construction of a modified oleo strut actuator used for suspension, shock absorption and ride-height elevation of the front wheels.

FIG. 4d and 4e represent front view and side elevation respectively of the air-ground vehicle in the nose down position that is useful when more down force is required for improving ground handling.

FIG. 5a shows details of the rear wheel suspension, anti-sway and shock absorption (damping) mechanism.

FIG. 5b shows internal construction of a pair of hydraulic piston and cylinder used for the purpose of shock absorption and as anti-sway mechanism.

FIG. 6a is top plan view of the air-ground vehicle of this invention with the wingtip addition segments attached in order to improve the aircraft's performance.

FIG. 6b is front view of the vehicle's wing with wing tip segments.

FIG. 6c is closeup cut-away view of the mechanism of joining the wing tip segment to the wing tip.

FIG. 7 is layout of the vehicle's cockpit control arrangement.

DESCRIPTION OF THE PREFERRED EMBODIMENTS

FIG. 1a through FIG. 1d show the general layout of the main embodiment of this invention. The vehicle is designated in its entirety by the reference numeral 1, and comprises a compact generally oval plan form fuselage 3 which is considerably shorter in length than the conventional aircraft. This short fuselage with a finess ratio of 4.7(length /maximum cross sectional diameter) couple with gradual tapering toward the rear result in significantly lower aerodynamic drag than a longer and more angular fuselage of a typical light aircraft. Toward the rear of the fuselage is a small diameter variable pitch propeller or fan 5 with a great number of low aspect ratio blades. To reduce vortec tip drag of the propeller 5, a propeller shroud or duct 7 is placed outside of the propeller. This ducted-fan unit helps reduce air flow turbulence aft of the fuselage hence resulting in further drag reduction of the fuselage in both form of skin friction and pressure drag. The shroud 7 is supported in place by three faired structures, the vertically oriented 9a and the horizontally oriented 9b's placed 120 degrees apart, originating from the rear of the fuselage. The horizontally oriented structures 9b are also directedly attached to tail-booms 11 which are in-turn attached to horizontal stabilizer 13. Attached to the tips of stabilizer 13 are a pair of vertical fins 15 in order to provide for yaw stability in the air mode. The fins 15 are small in size in order to reduce weight aft of the center of gravity (CG) 17 and to reduce the weathervane tendency when driving in strong cross wind. The ducted-fan propulsion unit placed in the rear of the fuselage does not induce such a strong adverse yaw control problem as would a front mounted propeller, necessitaing a larger tail fin in a conventional light aircraft. Furthermore, the stabilizer-tip-mounted vertical fins 15 do not suffer from buffeting due to the fuselage's wake at high angle of attack as would a center-line mounted fin in usual practice, therefore, they do not have to rise high above the fuselage. The tail fins 15 act as end plates to horizontal stabilizer 13 thereby increase its effectiveness. Behind the horizontal stabilizer 13 is the elevator 14 as commonly referred to as. Because the elevator 14 and part of stabilizer 13 is mounted right behind the propeller 5, very powerful pitch control authority is possible even at speed below the aircraft's stall speed and that will make for very quick stall and spin recovery with minimum lost of altitude, and that deep stall (complete stall of the rear horizontal stabilizer) simply cannot happen. This is similar in concept to vectored thrust control as proposed for experimental jet fighter aircrafts, enabling these fighters very rapid pitch change at very low airspeed. Behind vertical fins 15 are rudders 19, of large size in order to provide for large slip angle when landing in strong cross wind and also for rapid spin recovery. Toward the front of the fuselage are the canard surfaces 21. The canard is needed due to the short fuselage. Furthermore, the rear-mounted engine 29 forces the CG 17 to be more rearward than in a conventional front engined aircraft. The rearward CG location in a very short fuselage make the horizontal stabilizer moment arm very short, and therefore the horizontal stabilizer 13 must exert a large amount of down force in flight in order to balance the aircraft. This great amount of down force adds weight to the aircraft inflight and significantly reduce its performance. The canard surfaces 21 are therefore needed to provide upward lift in front of the CG 17 therefore reducing the amount of down force needed from the horizontal stabilizer 13. In fact, in crusing flight, the canard surfaces 21 are designed to provide $2/3$ to $3/4$ of the nose pitching up moment required, while the stabilizer 13 supplies the rest, making this design more efficient at cruise than a conventional light aircraft. Another advantage of canard design is its stall and spin resistance. Referring to FIG. 1b, the canard surface 21 has higher angle of attack than the main wing 4, therefore, the canard surfaces will stall before the main wing, causing the aircraft's nose to drop before the main wing reaches its stall angle of attack. Because the main wing cannot stall, the aircraft cannot enter a spin, because a spin requires that the main wing be stalled. However, a disadvantage of the canard design is that higher take off and landing speed is required hence longer runway is needed because the wing cannot be pitched up to the angle of maximum lift coefficient nor can wing flap be used to augment lift. To overcome this disadvantage of the canard design, the rear mounted horizontal stabilizer 13 will be used to provide proportionally more nose-pitch-up moment as the aircraft's pitch angle is nearing the stall angle of the canard. Upward deflection of elevator surface 14 may be used to provide more down force. Alternatively, simply lowering the wing's flaps 6 will cause a much larger downwash from the wing to impact the stabilizer 13 hence more down force without moving the elevator 14. Therefore, lowering of the wing flaps 6 requires little pitch trimming if at all. This is a highly desirable safety feature in an aircraft design aiming at FAA type certification. With deployment of wing flaps 6, the wing's effective angle of attack is increased without changing the angle of attack of the canard surfaces 21. Therefore, the canard surfaces will still provide lift to help keep the nose up. The canard surfaces' effective angle of attack can also be controlled by canard flaps 22. In slow speed approach with wing flaps partially deployed, the canard flaps 22 should also be lowered to the point where the canard surfaces has higher effective angle of attack than the main wing. The aircraft's sink rate should be controlled by the throttle setting instead of pitch control. In this fashion, the canard's protection against inadvertent stall is still effective, albeit at lower safety margin. In highly turbulent condition, the aircraft should make the landing approach with less wing flap deflection and at higher airspeed in order to maintain high safety margin. It is recommended that canard flaps 22 be used as the sole pitch control device in all phases of flight except short field rotation for take off or for fully stalled landing flare out, in which case the elevator is also used to increase the angle of attack of the whole aircraft at low airspeed. This way, pilot induced stall and spin incidences, which represent a fairly significant percentage of general aviation fatal accidents, can greatly be reduced. Both the stabilizer 13 and canard surfaces 21 should have a maximum span of no more than 8 feet (2.44 m) in order to be street legal.

For street use, the vehicle is equipped with a pair of front wheels 23 mounted directly underneath canard surfaces 21, and a pair of rear wheels 25 mounted on tubular spring steel legs 27 that serve also as suspension means. The rear wheels are retractable into the fuselage with mechanism similar to that of Cessna 182 RG and other high wing Cessnas, as shown in alternate position in FIG. 1b. Details of wheel suspension, shock absorption and anti sway mechanism will be explained in detail later in this specification.

Right behind the CG 17 is the vehicle's engine 29, preferrably a six cylinder all aluminum horizontal opposed turbocharged liquid cooled of automotive origin. Engine power is transferred directly to the propeller 5 via a long drive shaft 31. The engine should be designed to provide about 260 hp (193 kw) for take off at around 4500 rpm in order to keep the propeller tip speed at around 800 feet/s (244 m/s) given propeller diameter of 3.45 ft (1.05 m) for maximum efficiency and tolerable noise level.

For maximum weight reduction, the shrouded propeller unit may also be used as the sole means of ground propulsion, although with a maximum thrust around 1000 lbs (4454 N) and with an estimated vehicle gross weight at 2600 lbs (1181 kg) the vehicle will have problem climbing slope higher than 22 degrees. Furthermore, fuel mileage will be poor on the ground, not to mention that the strong propeller wind blast may be objectionable to some. Practically, however, the vehicle will seldom be loaded up to its maximum gross weight rating. For vehicle empty weight of 1400 lbs (636 kg) plus two occupants, luggage and minimum amount of fuel, totalling 600 lbs (272 kg), the vehicle weight will be around 2000 lbs and therefore an incline of up to 30 degrees can be marginally handle with some initial speed. Since 80% of U.S. population live in fairly flat areas, incline of 30 degrees or higher are uncommon. It may be more economical in many cases to park the vehicle at the airport and rent a car when occasionally visiting areas with hilly terrains.

For those living in mountainous areas, means for driving the rear wheel can also be made available in order to augment the motive force from the propeller 5, for example, by the use of small and light weight hydraulic motors 35 directly driving the rear wheels, mounted right next to the wheel hub. A hydraulic pump 33 mounted in front of the engine output shaft is used to supply hydraulic fluids under high pressure to the hydraulic motors 35.

Since the aircraft's stabilizer moment arms are so short, careful attention must be paid to shift in CG 17 during loading for optimal flight characteristic. The aircraft is designed to fly optimally with a 170 lbs (77 kg) occupant in the front seat 37 plus 70 lbs (32 kg) of luggage or ballast in the nose luggage compartment. With two front occupants, ballast is not needed, and any luggage must be placed on top of the rear seats 41, right next to the CG 17. With all four full size occupants in all four seats, some luggages must be placed in the rear luggage compartments 39a and 39b for optimal balance. Since the fuel is stored in the front sections of the wing near the CG 17, shift in the CG when fuel is comsumed is small and can be compensated for by trimming the pitch control surfaces 14 and 22.

FIG. 2a, 2b, 2c and 2d show the details of hydraulic wing-fuselage rotation and locking mechanisms. The wing 4 is rotatably mounted on top of the fuselage by resting on top of pylon 43 centrally located on the fuselage's centerline 10. Housed inside of pylon 43 is the wing rotation cylinder 51, with the cylinder 51 rotatable inside of the cylinder bearing 53, best visible in top down view FIG. 2b. The cylinder 51 is attached to the bottom of wing 4, while the cylinder bearing 53 is attached to the top structural frame crossmembers 52 of pylon 43. The aircraft fuel lines, electrical lines for wing strobe lights, electrical flaps etc. and aileron control cables are tunneled through the cylinder 51 in order to reach the fuselage. The aileron control cables are arranged so that they are taunt when the wing is in flying configuration and slack when the wing is in the roadable mode. On the bottom end of cylinder 51 there is attached torque arm 57 that is attached to a horizontally oriented hydraulic jack 59 which powers the 90 degree rotation of torque arm 57 and hence the cylinder 51 along with the whole wing unit 4. Mounted underneath and in the center of cylinder 51 is a vertically oriented hydraulic jack 61 for the purpose of lifting cylinder 51 along with the whole wing 4 upward less than a centimeter of height thereby unseating the wing against resilient vibration damping pad 44a on top of pylon 43 and providing clearance for wing rotation. The vertical hydraulic jack 61 is firmly attached to cross beam 63 which spans the fuselage width, in order to anchor the cylinder structure firmly in place preventing woble motion of the whole wing-inner cylinder assembly during rotation in turbulent wind condition. Supporting the wing on both sides of pylon 43 are wing support struts 47. On top of each support strut 47 is resilient pad 44b exerting pressure against the wing 4 and support strut 47 thereby preventing vibration between the interlocked parts that may cause unnecessary wear and structural fatigue. Mounted on top end of each support struts 47 on the inner side and on both front and rear ends of pylon 43 are the wing locking mechanisms 49, which is shown enlarged in FIG. 2d. The hydraulically activated locking mechanism 49 is comprised of a large-bore locking pin 65 slidably mounted on fuselage metal flange 67 that is attached to the fuselage frame. As shown in FIG. 2d, locking pin 65 is shown in its engaged position, holding fuselage metal flange 67 tightly in position with wing metal flange 69 which is mounted to the wing's structure. The inner end of locking pin 65 is protected from dirt by membrane 68. Locking pin 65 has its outer end connected to a thin hydraulic piston 71 slidingly fitted inside cylinder 73. Hydraulic hoses 75a and 75b on both ends of cylinder 73 supply hydraulic fluids under pressure entering and exiting cylinder 73.

In operation, in order to rotate the wing 90 degrees, the locking pins 65 are first retracted into their fuselage metal flanges 67. This is accomplished by directing high pressure hydraulic fluids into hose 75a while allowing fluids in cylinder 73 to exit through hose 75b. Next, high pressure hydraulic fluids will be pumped into vertical hydraulic jack 61 causing it to lift up the whole wing 4 unseating it from resilient pads 44a and 44b. Now, with sufficient clearance for rotation, horizontal jack 59 will be powered either to expand or retract linearly, thereby causing 90 degree rotation of torque arm 57 and therefore rotation of the whole wing. When this rotation is completed, the vertical jack 61 will be powered to contract thereby pulling downward wing 4 and squeezing against resilient pads 44a and 44b. This action will put the locking pin holes on the fuselage metal flange 67 in alignment with the locking pin holes on the wing metal flange 69. Then, locking pins 65 will be hydraulically powered to move inwardly from the fuselage metal flange into the hole on the wing metal flange 69, thereby locking the wing and fuselage tightly together. A hydraulic control system including an engine powered hydraulic pump 33 and a number of solenoid-controlled hydraulic valves (not shown). The hydraulic valves may be sequentially activated for the above sequence with electronic circuitry, requiring the push of only one button to start the sequence. Complete details of the hydraulic control system is out of the scope of this disclosure since its mechanism is well known in the art and is employed in many types of mechanical system.

FIGS. 3a through 3d are analogous to FIG. 2a through 2d, except that FIG.'s 3a–d illustrate a simpler manually operated wing rotation and locking mechanisms. These simple mechanisms have advantages including weight reduction, reduction in the aircraft development time, development costs as well as aircraft's purchasing price and maintenance costs. There are no hydraulic powered actuators except for vertical hydraulic jack 61 powered by a hand operated hydraulic pump. There is no need for torque transfer between the fuselage to the wing, hence no need for the cylinder structure 51 as in previous FIG.'s 2a–d. Axis for wing rotation is simply a metal rod 77 running through the wing thickness to the fuselage through channel 79 on top of the fuselage. Channel 79 is a hollow thick-walled tube supported on three sides by flanges 81 which are firmly attached to the pylon frame structure. Metal rod 77 also serves as a threaded bolt whereby the wing may be bolted onto by nuts 83a and 83b on top and bottom of the wing surfaces, respectively. The bottom end of rod 77 is also threaded in order to be screwed onto the top end of vertical hydraulic jack 61 and locked in place by nut 83c.

Referring to FIG. 3d, which is a close-up view of the manual locking mechanism, locking pin 65 is manually moveable via handle 66 on its outer end. Preventing locking pin 65 from sliding out of its engaged position is door 85, attached to wing support strut housing 47 by hinge 86 allowing the door 85 to be opened and closed. Latch 87 is used to lock the door 85 in its closed position. Preventing locking pin 65 from sliding inward is done by membrane 68 covering inner hole of the wing metal flange 69. Membrane 68 also serves to restrict dirts from getting into locking pin 65 causing resistance to its smooth sliding action.

Operational sequence of this manually operated system is similar to the hydraulically operated system. First, the vertical hydraulic jack 61 will be powered by a hand-operated pump to press the wing against the fuselage maximally in order to bring the holes on both metal flanges 67 and 69 into perfect alignment thereby minimizing friction on sliding action of locking pin 65. Then, door 85 will be opened and pins 65 will be pulled out of their engaged position. When all 4 pins are unlocked, vertical jack 61 will be pumped to lift wing 4 upward, unseating it against resilient pads 44a and 44b. The wing 4 then is rotated 90 degrees by force of the operator's arms pushing on the wing's leading edge. This should be easily accomplished because very little friction is involved. However, due to the wing's significant rotational inertia involved, the operator is cautioned against letting the wing to be over-rotated too far past the designated 90 degree position, or damage to the wing aileron control cables as well as the wing-to-fuselage fuel lines may happen. Then, after 90 degree rotation is accomplished, vertical jack 61 is powered to press the wing against the resilient pads on the fuselage maximally thus bringing the holes on flanges 67 and 69 into perfect alignment. The locking pins 65 are then manually pushed inward into locking position, and finally, doors 85 are closed and latched tightly.

FIGS. 4a through 4d illustrate the vehicle's front suspension, shock absorption and nose height leveling mechanism. The nose height leveling mechanism is necessary for short-field take off in which case the aircraft's nose must be raise in order to increase the wing's angle of attack before the aircraft can be quickly airborne at airspeed just above its stall speed. On the other hand, for ground traveling mode in turbulent wind condition, uneven or slippery ground surface, the nose of the vehicle must be lowered in order to bring about negative angle of attack on all of the aircraft's surfaces for increasing the down force aerodynamically, referring to FIG. 4d, thereby preventing momentary lost of control due to wind gust impacting on the rather large wing surface. The canard flaps 22 and the rear elevator 14 may also be trimmed in the up position, creating more down force.

In order to maintain constant wheel track 93 when the vehicle's nose is lowered or raised (as in FIG. 4d), and to minize any change in wheel camber during same operation, it is best to adapt a well utilized automotive front suspension principle known as "short arm long arm suspension." Referring to FIG. 4a, the long arm of the suspension system is also the front canard surfaces 21, which are articulated in the midline on hinge 89, allowing flapping motion up and down. The short arm 95 is mounted on top of the long arm and articulated with the vehicle's frame via hinge 97 and articulated with the top end of front wheel strut 24 via ball joint 99. Suspension and height leveling means is by modified oleo-pneumatic strut units 91 mounted on both sides. Details of the oleo-pneumatic struts will be explained in FIG. 4b. The front wheels 23 are rotatably attached to the front wheel struts 24. Front wheel struts 24 articulate at the tips of canard surfaces 21 on gimbal joint 101, allowing simultaneously rotational movement on steering axis 90 and change in wheel camber as the suspension arms move up and down. Steering axis 90 is offset a predeterminable degrees from vertical, also referred to in automotive language as "steering axis inclination," in order to improve steering self-centering tendency and to reduce tire scuffing in rough road.

In FIG. 4b, there is shown internal details of the modified oleo-pneumatic strut unit 91. This is basically a two-chamber design wherein the lower chamber 92 contains hydraulic fluids and the upper chamber 94 contains gaseous substance under pressure. A thin, freely moving disc 96 separates the upper chamber from the lower chamber, thereby preventing the gas and fluid from coming into contact. The lower chamber is further divided by piston unit 98 which is movable in turn causing to contraction and expansion of strut unit 91. Piston unit 98 is limited in its upward travel by partitioning plate 100, and disc 96 is limited in its downward travel also by the same plate. Right underneath plate 100 is upper hydraulic hose 102, supplying fluids under pressure in order to raise the vehicle's nose up. On the bottom of strut unit 91 is the lower hydraulic hose 103 which supplies pressurized fluids to lower the vehicle's nose, in which case outgoing fluids will exit strut unit 91 via upper hose 102. It can be seen that because of plate 100, it is not possible for the gas in the upper chamber to accidentally exit out of strut unit 91 via hose 102, because disc 96 will move down to seal the potential exit route for the gas in upper chamber 94. When used as suspension means, both hoses 102 and 103 will be closed by appropriate hydraulic valve means (not shown), thereby allowing fluids from the upper surface of piston unit 98 to go through plate 100 via hole 104 when upward force is exerted on piston unit 98. The fluids will push disc 96 upward hence compressing against the gas in the upper chamber 94. Hole 104 serves as damping means for strut unit 91, allowing stiffer resistance of the strut unit 91 in respond to higher velocity shock. Metering rod 105 on top of piston unit 98 placed in alignment with hole 104 further restricting the orifice on hole 104 as piston unit 98 is closing in on plate 100, thereby further enhancing the shock absorption property of strut unit 91.

FIG. 4c shows the top-down view of the front suspension and steering mechanism of the vehicle. Please note that the upper suspension arm 95 is V-shaped in order to help absorb torsional loads on the lower suspension arm 21, and to allow for castor and camber adjustment of the front wheels. The strength added to the front wheels by the V-shaped upper suspension arm 95 makes the front wheels strong enough for extended rough field operation, a task that conventional tricycle wheeled aircraft cannot handle, due to the fragility of the tricycle nose gear. Camber and castor adjustment in the front wheels may be done by adjusting the distance of hinge 97a in front and another hinge 97b in the rear with respect to the fuselage, similar to front wheels alignment adjustments in rear-wheel-drive automobile. The front suspension system also features an U-shaped stabilizer bar (not shown for the sake of clarity) as found in automotive practice to prevent excessive leaning of the vehicle when side-way force is applied to the vehicle as in a turn or in cross wind. The steering system is analogous to automotive's non-powered rack-and-pinion steering system. Rotational movement from steering wheel 107 is transmitted by steering shaft 108 to pinion gear box 109 at the end of shaft 108. Pinion gear box 109 is mated to linear steering rack 110. Rack 110 is then connected to steering rod 111 via hinge joint 113 in nearly the same longitudinal axis as that of hinge 89 therefore preventing unwanted steering input as the result of the lower suspension arm 21's flapping motion on hinge 89. Steering rod 111 is connected to steering arm 112 which is attached to front wheel strut 24, at a predetermined offset horizontal angle in order to allow for appropriate degree of toe-out for the front wheels in a turn as in automotive practice.

Details for rear wheel suspension is illustrated in FIG. 5a and 5b. Since the rear wheels are not steerable and have no height-leveling mechanism, their suspension mechanism is much simpler than that of the front wheels. In FIG. 5a, the rear wheels 25 are mounted to the fuselage on landing gear legs 27 which are made from elastic tubular spring steel allowing them to act as suspension means. Shock absorption and damping means is by shock struts 115 attached to the fuselage on hinges 116. The other end of the shock strut 115 is threaddedly connected to a hollow shaft 117, which is hingedly attached to the outer end of leg 27 by hinge joint 118. In order to enable the rear wheels to be retractable into the fuselage inflight, the shock strut 115 must be disconnected by unscrewing its lower end from shaft 117, and then stowed inside the fuselage by rotation on hinge 116 as shown in its alternate position by the phantom lines. Shaft 117 then may be disconnected from hinge 118 in order to be stored in the fuselage, or shaft 117 may simply be folded into landing gear leg 27 at hinge joint 118 and strapped onto leg 27 by an elastic strap (not shown). An optional hydraulic motor 35 may be directly attached to wheel hub 26 serving as ground propulsion means in addition to the ducted-fan unit as discussed.

Referring to FIG. 5b, a pair of shock struts 115 may also serve as rear wheel stabilizer (anti-sway) means, since the use of a conventional sway bar as in automotive practice is very difficult with the retractable landing gear system in this vehicle. Additionally, saving in weight and cost can be realized with additional function for the shock struts 115. A pair of simple hydraulic cylinders 119 and pistons 120 is used with hydraulic hoses 121 attached to both ends of the cylinders. The bottom end of one cylinder 119 is hydraulically connected to the top end of the other cylinder, and vice-versa. When completely filled with hydraulic fluids, it can be seen that movement of the piston 120 in one shock strut unit 115 will cause a corresponding movement in the same direction by the piston of the other shock strut. The size of hydraulic hoses is selected in order to provide appropriate damping response for shock absorption purpose. The shock absorption property of the system may be adjustable if a flow-restricting and adjustable hydraulic valve 124 is installed on each hydraulic line 121. This is a desirable feature since the flow of fluids on the hydraulic lines is laminar in which flow resistance is highly dependent of viscosity, whereas in a conventional automotive shock strut flow resistance through a small orifice is due to turbulent flow which is less dependent on fluids vicosity but more on the fluids density, and that with changes in temperature, hydraulic fluids viscosity varies much more than fluids density. Near the top of each cylinder 119 there is attached a small chamber 122 normally filled with air. The air in this chamber 122 is hydraulically separated from the hydraulic fluids by diaphragm 114. This small amount of air will allow a small degree of spontaneity in movement of the shock strut 115 without impacting the opposite shock strut in response to high velocity, highly repetitive but low amplitude road shocks. For maintenance purpose, cap 123 on top of each cylinder 119 may be unscrewed in order for the fluids level to be checked and filled.

For improving long range efficiency at maximum gross weight rating, it is desirable to add wing tip segments about 3 feet long (0.91 m) on each side in order to improve the wing's aspect ratio and total wing area. This addition boosts the wing aspect ratio from 5:1 to almost 7:1 which is a significant increase. Without this wing tip addition, the main wing is only about 21.5 feet (6.5 m) long in order to fit into a standard automobile garage, and would be somewhat small (about 90 ft$^2$ or 8.26 m$^2$) and low in aspect ratio (5:1) for an aircraft with maximum gross weight rating of 2600 lbs (1181 kg). However, when partially loaded to 2000 lbs (909 kg) gross weight, the small and stubby wing would prove to be more efficient at hight speed cruise (at 65% to 75% of take-off power) than a larger wing, because with lighter wing loading at high speed cruise, the parasite drag of an aircraft is several times higher than the induced drag of the wing. Hence, reduction in overall parasite drag with a smaller wing improves high speed efficiency. However, at higher wing loading, at higher altitude, during steep climb or at lower airspeed, the wing's induced drag becomes the more dominant form of drag, and hence a larger wing with higher aspect ratio would improve the aircraft's climb rate, range and fuel mileage. In FIG. 6a, the aircraft is shown with its additional wing tip segments 125 attached, joined at the main spars 126a-b, and at the rear or trailing edge spars 127a-b. Hingeably attached to the trailing edge spars 127a-b are flaps 6 extending outward from the wing root, and lateral to wing flaps 6 are ailerons 8a-b for controling in the roll axis. Each wing tip segment 125 has an outer aileron portion 8b on its trailing edge, and this piece must be joined with the main wing's aileron portion 8a prior to flight. The aileron surface is much larger with addition of the wing tip segments 125, but this is necessary due to the fact that a longer wing produces more resistance on the roll axis than a short stubby wing. When not attached to the main wing's tips, the tip segments 125 may be stored inside the aircraft in the rear passenger compartment as represented by the phantom lines. The aileron segment 8b of the wing tip segments 125 must be rotated almost 180 degrees on its hinged attachment in order to overlap the tip segment 125 so that the combined structure may fit through the aircraft's passenger door. When flying with passengers or cargo in the rear seats, the additional weight of the aircraft would necessitate the attachment of the wing tip segments to the main wing. Several surveys have shown that in private aircrafts with 4 or more seats, the majority of the time the aircrafts are flown with only one or two persons in the front seats, therefore, occasionally having to manually attach the wing tip segments onto the main wing before flying should not be a major inconvenience. The aircraft may carry four occupants without the wing tip segments on a short flight with minimum fuel and no luggage.

FIG. 6b is a frontal view of the larger wing as in FIG. 6a. FIG. 6c shows details of one possible method of joining the wing tip segments 125 to the main wing 4. Wing tip segment 125 has its main spar 126b with a protruding tongue 126c that is mated with an U-shaped recess in the wing's main spar 126a, and the junction is secured by metal bolts 128.

FIG. 7 shows the aircraft's unique cockpit layout. As discussed, for maximum safety and convenience, this air-ground vehicle must have cockpit control arrangement common to both automobile drivers and airplane pilots. For flying, the ailerons and front canard flaps are controlled by a single joystick 129, for roll and pitch control, placed in between the two front seats. This makes the joystick 129 accessible to both front seats occupant in case of emergency, or for training purpose. Furthermore, the pilot's arm is well supported by armrest 130, preventing unwanted control input to the joystick 129 in turbulent air when an unsupported arm holding the joystick tends to flop around. Many amateur built aircrafts have two joysticks, each is placed in front of each front seat for dual-occupant accessibility. The disadvantage of this setup is difficulty in entering and exiting the aircraft, more complexity as well as lack of arm support as discussed. Rudder and brake control is via the two rudder pedals 131 placed in conventional aircraft cockpit position. The rudder pedals are horizontally pivotable on axis 133 for rudder control and they are also pivotable vertically on axis 135 for differential toe braking as in conventional aircraft.

For braking while in roadable mode, either both feet may be used as in aircraft toe-braking action, as soon as the right foot is lifted off the gas pedal 137, or to comply more to conventional automotive practice of braking with only the right foot, the toe-ends of both rudder pedals 131 may be linked together by a metal bar 139, and right in the middle and on top of this metal bar 139 there is placed a conventional automotive style brake pedal 141. If the latter method is chosen, the horizontal pivoting motion of the rudder pedals should be locked when the vehicle is in the roadable mode for a more positive feel during brake application. The use of differential toe braking action in the former method for the roadable mode is mechanically simpler and can provide additional steering control in case of emergency. As shown earlier, steering in the roadable mode is via conventional automotive style steering wheel 107 linked to conventional rack-and-pinion linkage to the front wheels.

A major different between this aircraft and any other aircraft ever designed is that besides pitch control means of the canard flaps 22, an additional method of pitch control is provided, by controlling the elevator surface 14 by pushing forward or pulling backward on the steering wheel 107 mounted on telescopic steering shaft. This method of elevator control is utilized in the majority of today's general aviation aircraft and hence linkage mechanism is not illustrated here. As discussed earlier, this gives enhanced pitch control authority in the short-field takeoff and landing phase when high angle of attack is needed. In non-aerobatic level flight, (as well as in the roadable mode) the elevator control is mechanically locked in order to prevent pilot overcontrolling the aircraft, thereby causing accidentally stall, spin or accidental breakup of the aircraft inflight due to overstress which may be fatal. The elevator control action may always be automatically locked by a spring loaded lever 143 on the steering wheel 107, only to be released temporarily by hand-gripping action near the steering wheel rim, pulling lever 143 outward out of its locking position when elevator control is needed. In this fashion, instant emergency access to the elevator control is possible with only the left hand in the steering wheel on the driver's seat.

SUMMARY, RAMIFICATION AND SCOPE

Accordingly, the reader will see that the rapidly convertible aircraft of this invention is not just a high performance aircraft with high speed and range, but it has far greater utility than the conventional fixed-winged aircraft. Unlike most of the roadable aircraft designs of the prior art that must undergoes complex and time-consuming conversion from the roadable mode to the flight mode, this invention allows for automatic conversion from roadable mode to flight mode within seconds while cruising in the highway, thus opens up far more traveling flexibilities than the current airport-dependent conventional aircraft. Far too many lifes have been lost when pilots of light aircrafts attempted to take off or land in unsuitable airport condition, such as in strong cross wind, too high terrain surrounding the airport, too low air density, poor weather etc. because the pilot simply has little choice. Pilots of a rapidly convertible aircraft, on the other hand, simply drive to a more suitable location for take-off or land at better airstrip and drive to the final location, or simply drive on the highway until more suitable weather is encountered.

While I have shown and described in considerable details what I believe to be the preferred form of my invention, it will be understood by those skilled in the art that the invention is not limited to such details but may take various other forms within the scope of the claims that follow. For example, the two front wheels with their complex suspension system may be replaced by a single front wheel as the customary practice in conventional aircrafts, with gain in flight performance traded for reduction roadway handling and stability.

What is claimed is:

1. In a roadable flying vehicle designed to operate effectively both in the air and in the roadway, said vehicle having a monoplane wing with a span, a fuselage with a length significantly shorter than the span of said wing, a cabin with a cockpit for housing an operator, a center of gravity, a longitudinal axis, a width, a top, a front end, two lateral sides, and a rear end, the combination comprising:

ground-supporting means comprising of front ground-supporting means disposed at the front end of the vehicle and rear ground-supporting means mounted behind the center of gravity, said ground-supporting means having road wheels in contact with a supporting surface, on each lateral side of the vehicle, a vertical stabilizer means located at the rear end of the fuselage, a horizontal stabilizer means located on at least one end of the fuselage, an air propulsion means for propelling said vehicle while flying in the air, a ground propulsion means for moving said vehicle while rolling in the roadway, said monoplane wing having a wing span significantly longer than the length of said fuselage, for providing a majority of vertical lifting force to the vehicle, said wing is rotatably mounted on top of said fuselage on a wing pivot mechanism whereby said wing is horizontally rotatable between a flight position with the wing span approximately orthogonal to the fuselage's longitudinal axis and a roadable position with the wing span approximately parallel to the longitudinal axis of the fuselage, thereby allowing the vehicle to have a maximum width within legal limit for use in the roadway but potentially blocking upward vision from the vehicle's cockpit, hence, means for providing adequate upward vision from the vehicle's cockpit in the roadable position, thereby allowing the vehicle's operator to see high-mounted traffic signal lights and road signs mounted on highway overpass, said means for providing adequate upward vision from the vehicle's cockpit in the roadable position is comprised of:

rearward disposition for the air propulsion means of the vehicle, thereby bringing the center of gravity of the vehicle toward a rear end of the cabin, a horizontally-oriented elongated surface disposed significantly in front of the wing for providing upward-lifting force to the vehicle significantly in front of the center of gravity, thereby allowing said wing to be mounted in a rearward position with respect to the center of gravity, and whereas, said wing is further comprised of:

a center section having a sufficiently short span for use in the roadable position, thereby, in combination with the rearward wing mounting position, allowing for sufficient clearance for adequate upward vision from the cockpit, a pair of wing tip segments for extending the span of said wing for use in the flight position, extension means capable of extending said pair of wing tip segments laterally from said wing center section thereby increasing the vertical lifting force and efficiency of the wing in the flight position, and, sealing means disposed between the fuselage and the wing, said sealing means is capable of effectively sealing potential gap between said wing and said fuselage in both the flight position and the roadable position.

2. The vehicle of claim 1 wherein the ground-supporting means are stabilized by anti-sway means for preventing excessive leaning of the vehicle, said anti-sway means is comprised of:

a pair of hydraulic struts each thereof is disposed on a lateral side of the vehicle, each of said strut mechanically links a respective road wheel of said vehicle to a structural component of said vehicle, each of said hydraulic strut is comprising of a piston and a cylinder, wherein said piston partitions said cylinder into a top compartment and a bottom compartment, pressure hose means hydraulically connecting the top compartment of one hydraulic strut to the bottom compartment of the other hydraulic strut on the other lateral side of the vehicle, and vice versa, thereby resulting in anti-sway property since upward force on one hydraulic strut on one lateral side of the vehicle causes a corresponding upward force on the other hydraulic strut on the other lateral side of the vehicle, that, in turn, preventing excessive leaning of the vehicle when experiencing a strong lateral force.

3. The vehicle of claim 2 wherein the hydraulic struts further serve as shock-absorption means for the ground-supporting means, said ground-supporting means further comprising:

flow-restricting means disposed in serial hydraulic connection between said pressure hose means, thereby creating resistance to movement of said piston within said cylinder of said hydraulic strut.

4. The vehicle of claim 3 wherein the rear ground-supporting means is retractable into the fuselage, said rear ground-supporting means is comprised of:

a pair of landing gear legs each having an outer end protruding significantly outside of the fuselage's width, said landing gear legs are made of elastic material thereby serving also as suspension means, a pair of road wheels each thereof is rotatably mounted onto each outer end of said landing gear legs, landing gear retraction means for completely retracting said rear ground-supporting means into the fuselage while in flight, and whereas, said shock absorption means and said anti-sway means are provided by: said hydraulic struts, said pressure hose means and said flow-restricting means, thereby allowing for energy absorption of the rear wheels in rough road condition as well as preventing excessive swaying of the vehicle when exposed to excessive lateral forces that can lead to a complete roll-over.

5. The vehicle of claim 1 wherein the wing pivot mechanism further comprises:

a wing rotational axis, axis bearing means surrounding said wing rotational axis capable of supporting the wing in its entirety during wing rotation, allowing for low-friction wing rotation, resilient sealing means sandwiched between the wing and the top of the fuselage in order to seal potential gap between the fuselage and the wing and to restrict transmission of vibration between the fuselage and the wing, wing lifting means mounted nearby the wing rotational axis for lifting the wing up from the fuselage thereby unseating the wing from the sealing means prior to wing rotation, and, wing rotation means for powering the wing rotation between the flight position and roadable position, releasable wing locking means for tightly securing the wing to the fuselage directly against a pluriality of fuselage structural members, said locking means are distributed around the wing rotational axis on top of the fuselage, thereby strengthening the wing and the fuselage by making the wing a structural member of the fuselage and vice versa.

6. The vehicle of claim 5 wherein the axis bearing means, the wing lifting means and the wing rotation means further comprise:

a cylindrical structure firmly attached underneath the wing for entirely supporting said wing during wing rotation, said cylindrical structure has a top end, a bottom end, and a torque arm, said torque arm is disposed perpendicular to the wing's rotational axis, said cylindrical structure is rotatably supported on the top end inside a ring bearing mounted inside the top of the fuselage, said cylindrical structure is rotatably supported on the bottom end by being mounted on top of a hydraulic strut unit mounted on a fuselage cross member, said strut unit is capable of lifting the entire wing structure off the fuselage thereby providing clearance for wing rotation, said torque arm of said cylindrical structure is attached to a hydraulic actuator, said actuator is attached to the fuselage whereby linear motion generated by said actuator is translated into rotational motion of the cylindrical structure and hence rotation of the wing.

7. The vehicle of claim 5 wherein each of the releasable wing locking means is comprised of:

a fuselage flange attached to a structure in the fuselage, a wing flange attached to a structure within the wing, a locking pin slidable between both the fuselage flange and the wing flange thereby locking the wing and the fuselage together, and, sliding means for sliding said locking pin between a locked position in which said locking pin is positioned in sliding engagement through both of said flanges, and an open position in which said locking pin is retracted to within only one of the two of said flanges, allowing the other flange to rotate pass during wing rotation.

8. The vehicle of claim 5 wherein the axis bearing means, wing lifting means and wing rotation means further comprise:

a rod protruding through said wing from underneath the wing for supporting said wing during wing rotation, said rod has a top end and a bottom end, said rod is rotatably supported on the top end inside a channel serving as top bearing, said channel is formed inside the top of the fuselage, said rod is rotatably supported on the bottom end by being mounted on top of a wing lifting means mounted on a fuselage cross member, said wing lifting means is capable of lifting the entire wing structure off the fuselage thereby providing clearance for wing rotation, whereas the wing rotation means is manually accomplished by force of a human's arm pushing against a leading edge of the wing.

9. The vehicle of claim 5 wherein each of the releasable wing locking means is comprised of:

a fuselage flange attached to a structure in the fuselage, a wing flange attached to a structure within the wing, a locking pin slidable between both the fuselage flange and the wing flange thereby locking the wing and the fuselage together, said locking pin has a handle in order for the operator to manually slide said locking pin between a locked position in which said locking in is positioned in sliding engagement through both flanges, and an open position in which said locking pin is retracted to within only one of the two flanges, allowing the other flange to rotate pass during wing rotation.

10. In an aircraft having a fuselage with a longitudinal axis and a wing, said wing being rotatable on a wing pivot mechanism between a flight position with the wing span generally orthogonal to the fuselage longitudinal axis and a stowed position with the wing span generally orthogonal to the fuselage longitudinal axis of the fuselage, said wing pivot mechanism comprising:

a wing rotational axis, axis bearing means surrounding said wing rotational axis capable of supporting the wing in its entirety during wing rotation, allowing for low-friction wing rotation, resilient sealing means sandwiched between the wing and the top of the fuselage in order to seal potential air gap between the fuselage and the wing and to restrict transmission of vibration between the fuselage and the wing, wing lifting means mounted nearby the wing rotational axis for lifting the wing up from the fuselage thereby unseating the wing from the sealing means prior to wing rotation, and, wing rotation means for powering the wing rotation between the flight position and roadable position, releasable wing locking means for tightly securing the wing to the fuselage directly against a plurality of fuselage structural members, said locking means are distributed around the wing rotational axis on top of the fuselage, thereby strengthening the wing and the fuselage by making the wing a structural member of the fuselage and vice versa.

11. The aircraft of claim 10 wherein the axis bearing means, wing lifting means and wing rotation means further comprises:

a cylindrical structure firmly attached underneath the wing for entirely supporting said wing during wing rotation, said cylindrical structure has a top end, a bottom end, and a torque arm, said torque arm is disposed perpendicular to the wing's rotational axis, said cylindrical structure is rotatably supported on the top end inside a ring bearing mounted inside the top of the fuselage, said cylindrical structure is rotatably supported on the bottom end by being mounted on top of a hydraulic strut unit mounted on a fuselage structural member, said strut unit is capable of lifting the entire wing structure off the fuselage thereby providing clearance for wing rotation, said torque arm of said cylindrical structure is attached to a hydraulic actuator, said actuator is attached to the fuselage whereby linear motion generated by said actuator is translated into rotational motion of the cylindrical structure and hence rotation of the wing.

12. The aircraft of claim 10 wherein each of the releasable wing locking means is comprised of:

a fuselage flange attached to a structure in the fuselage, a wing flange attached to a structure within the wing, a locking pin slidable between both the fuselage flange and the wing flange thereby locking the wing and the fuselage together, and, sliding means for sliding said locking pin between a locked position in which said locking pin is positioned in sliding engagement through both of said flanges, and an open position in which said locking pin is retracted to within only one of the two of said flanges, allowing the other flange to rotate pass during wing rotation.

13. In a roadable flying vehicle designed to operate effectively both in the air and in the roadway, said vehicle having a center of gravity, a longitudinal axis, a fuselage with a cabin and a cockpit for housing an operator, a width, a length, a top, a front end, two lateral sides, and a rear end, the combination comprising:

a vertical stabilizer means located at the rear end of the fuselage, a horizontal stabilizer means located on at least one end of the fuselage, an air propulsion means for propelling said vehicle while flying in the air, a ground propulsion means for moving said vehicle while rolling in the roadway, a wing attached to the fuselage at least in the flight mode, said wing is modifiable for street use whereby the vehicle is rendered with a maximum width within legal limit for use in the roadway, ground supporting means comprising of front ground support means disposed at the front end of the vehicle and rear ground supporting means mounted behind the center of gravity, said ground supporting means having road wheels in contact with a supporting surface, on each lateral side of the vehicle, anti-sway means mechanically linked to said ground supporting means for preventing excessive leaning of the vehicle, said anti-sway means is comprised of:

a pair of hydraulic struts each thereof is disposed on a lateral side of the vehicle, each of said strut mechanically links a respective road wheel of said vehicle to a structural component of said vehicle, each of said hydraulic strut is comprising of a piston and a cylinder, wherein said piston partitions said cylinder into a top compartment and a bottom compartment, pressure hose means hydraulically connecting the top compartment of one hydraulic strut to the bottom compartment of the other hydraulic strut on the other lateral side of the vehicle, and vice versa, thereby resulting in anti-sway property since upward force on one hydraulic strut on one lateral side of the vehicle causes a corresponding upward force on the other hydraulic strut on the other lateral side of the vehicle, that in turn, preventing excessive leaning of the vehicle when experiencing a strong lateral force.

14. The vehicle of claim 13 wherein the hydraulic struts further serve as shock-absorption means for the ground supporting means, the combination further comprising:

flow-restricting means disposed in serial hydraulic connection between said pressure hose means, thereby creating resistance to movement of said piston within said cylinder of said hydraulic strut.

15. The vehicle of claim 14 wherein the rear ground-supporting means is retractable into the fuselage, said rear ground-supporting means comprises of:

a pair of landing gear legs each having an outer end protruding significantly outside of the fuselage's width, said landing gear legs are made of elastic material thereby serving also as suspension means, a pair of road wheels each thereof is rotatably mounted onto each outer end of said landing gear legs, landing gear retraction means for retracting said rear ground-supporting means into the fuselage while in flight, and, whereas, said shock absorption means and said anti-sway means are provided by: said hydraulic struts, said pressure hose means and said flow-restricting means, thereby allowing for energy absorption of the rear wheels in rough road condition as well as preventing excessive swaying of the vehicle when exposed to excessive lateral forces that can lead to a complete roll-over.

* * * * *